Figure 1:
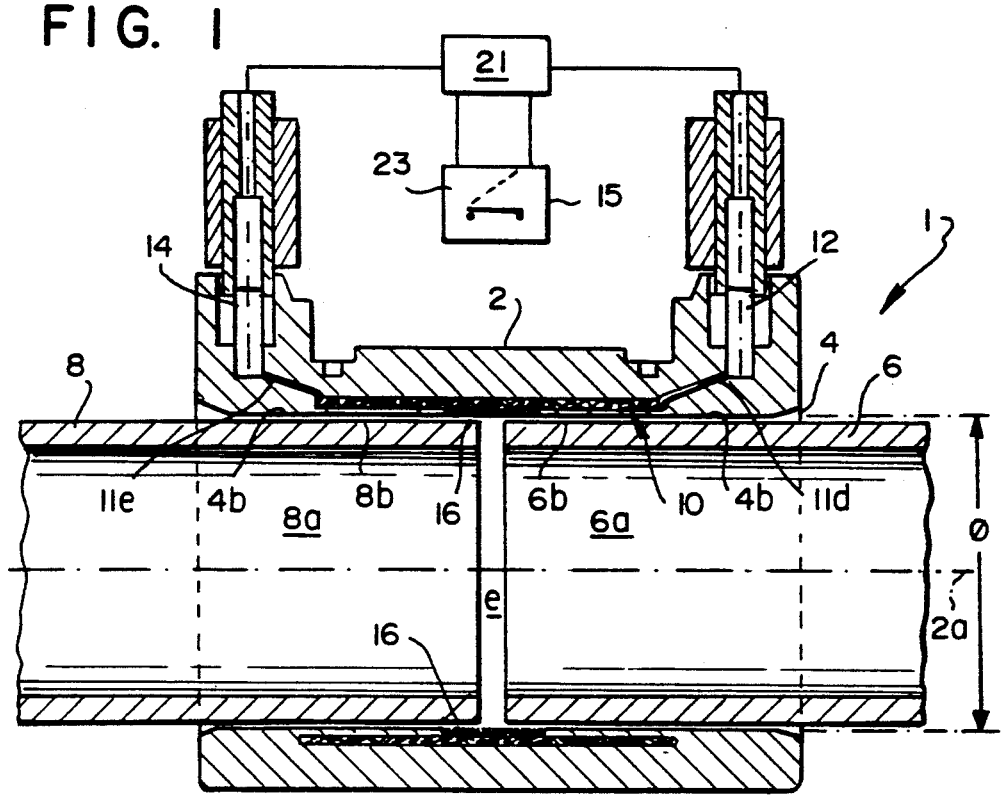

United States Patent [19]
Dufour et al.

[11] Patent Number: 5,141,580
[45] Date of Patent: Aug. 25, 1992

[54] CONNECTION COMPONENT FOR TOGETHER PLASTIC ELEMENTS BY THERMAL WELDING

[75] Inventors: Denis Dufour, Deuil la Barre; Francois Fortin, Paris, both of France

[73] Assignee: Gaz De France, Paris, France

[21] Appl. No.: 618,391

[22] Filed: Nov. 27, 1990

[30] Foreign Application Priority Data

Nov. 29, 1989 [FR] France .................. 89 15707

[51] Int. Cl.⁵ .............. B29C 65/30; F16L 13/02; F16L 47/02; H05B 3/40
[52] U.S. Cl. .................. 156/158; 156/273.9; 156/294; 219/517; 219/535; 219/552
[58] Field of Search ............. 156/273.9, 274.2, 304.2, 156/304.6, 158, 294; 285/21; 219/497, 517, 535, 544, 548, 552, 549, 528, 522

[56] References Cited

U.S. PATENT DOCUMENTS

| | | | |
|---|---|---|---|
| 2,797,296 | 6/1957 | Fowler et al. | 219/552 |
| 2,945,115 | 7/1960 | Weitzel | 219/535 |
| 3,061,503 | 10/1962 | Gould et al. | 156/274.2 |
| 3,378,672 | 4/1968 | Blumenkranz | 219/544 |
| 4,436,986 | 3/1984 | Carlson | 219/505 |
| 4,618,168 | 10/1986 | Thalmann et al. | 156/273.9 |
| 4,634,844 | 1/1987 | Lodder et al. | 219/244 |
| 4,642,155 | 2/1987 | Ramsey | 156/274.2 |
| 4,684,417 | 8/1987 | Grandclement | 156/294 |

FOREIGN PATENT DOCUMENTS

| | | | |
|---|---|---|---|
| 0159733 | 10/1985 | European Pat. Off. | |
| 0183188 | 6/1986 | European Pat. Off. | |
| 0258827 | 3/1988 | European Pat. Off. | |
| 0301864 | 2/1989 | European Pat. Off. | |
| 1071433 | 12/1959 | Fed. Rep. of Germany | 285/21 |
| 0528697 | 11/1972 | Fed. Rep. of Germany | 219/535 |
| 0002514 | 6/1985 | PCT Int'l Appl. | 219/548 |
| 2076489 | 12/1981 | United Kingdom | |

*Primary Examiner*—Michael W. Ball
*Assistant Examiner*—Steven D. Maki
*Attorney, Agent, or Firm*—Thomas R. Morrison

[57] ABSTRACT

The invention relates to a connection component equipped with an electrical resistor for the welding of elements made of heat-fusing plastic. According to the invention, the resistor takes the form of a single wire coated with an electrically insulating layer and having points of intersection, the coating layer fusing at a temperature between the fusion temperature of the components to be joined together and their temperature of thermal damage, so that short-circuits are generated on the wire and so that the stopping of the supply of current to the latter is commanded. The invention is used particularly for the thermal welding of polyethylene pipes used in the gas industry.

8 Claims, 2 Drawing Sheets

CONNECTION COMPONENT FOR TOGETHER PLASTIC ELEMENTS BY THERMAL WELDING

The present invention relates to the assembly of components consisting at least partially of heat-fusing material.

At the present time, such assemblies are essentially carried out by thermal welding. Moreover, this technique is widely used, especially in the gas industry, for making junctions between pipes in distribution networks (particularly polyethylene pipes of a density higher than approximately 925 kg/m$^3$).

According to a process which is very widespread nowadays, the components to be connected, usually pipes, are assembled by means of a connection component.

Whatever the type of this component (sleeve, branch offtake, etc), it conventionally possesses, embedded in its thickness, an electrical heating resistor generally consisting of a coiled electrically conductive wire arranged in the vicinity of the surface of the component which is to come opposite that of the pipe or pipes.

The welding operation is carried out by placing the parts of the components to be welded opposite one another and by connecting the coiled electrical wire to an electrical source (such as a source of rectified alternating current) which, by the Joule effect, will heat the resistor and bring about the softening of the surrounding plastic of the components to fusion, thus carrying out the welding.

So that this welding is of good quality, that is to say to obtain a junction sealed against gaseous fluids and a satisfactory mechanical resistance, the heating time must be between a minimum duration making it possible to obtain a correct weld between the components after cooling and a maximum duration lower than that liable to cause thermal damage to the components.

A serious problem encountered nowadays concerns the distribution of the heating zone and the possibility of controlling this heating so as to interrupt it exactly at the opportune moment, for example when the conditions for a good weld are present simultaneously.

However, the means and techniques employed at the present time to detect this "ideal" moment prove ineffective in some cases.

The invention therefore provides, first of all, a process intended for detecting the best possible heating condition and for then interrupting the electrical supply to the resistor obtained for this purpose from a single wire normally covered with a layer of insulating material and arranged within a plastic constituting the component to be heated, this process being characterized in that:

with the said coated resistance wire having points where the strands of the wire intersect, the fusion temperature of the material constituting its insulating coating layer is selected so that it is between a minimum temperature higher than the fusion temperature of the plastic of the component and a maximum temperature lower than the temperature of thermal damage to this same component;

the said resistor is supplied with electricity until the insulating layer coating it is heated to its fusion temperature and until short-circuits are caused at at least some of the points of intersection of the resistance wire, the variations in voltage and/or in intensity following these short-circuits are detected, and the supply of current to the resistor is then interrupted.

Thus, a more uniform heating of the components will be obtainable, since the heat-exchange surface will be larger than where the coiled wire is concerned. Furthermore, as long as the insulating layer of the resistance wire has not fused, any risk of short-circuits on the resistor is avoided. Also, during the fusion of this layer, advantage is then taken of the occurrence of the first short-circuits to stop the heating before the components are thermally damaged.

In addition to this process, the invention also relates to a connection component for elements made of heat-fusing plastic and having a surface for connecting it to a corresponding surface of these same elements, the said component comprising an electrical resistor obtained from a single wire coated with a layer of electrically insulating material and arranged in the vicinity of the said connecting surface, in order to bring about the fusion of the material surrounding it and to induce welding between the said component and the elements, this component being characterized in that the coated resistance wire has points of intersection, and the fusion temperature of the material constituting its insulating coating layer is such that it is between a minimum temperature higher than the fusion temperature of the plastic of the component and a maximum temperature lower than the temperature of thermal damage to this same component.

Moreover, the invention also relates to a device which can be used for detecting the best possible heating and for interrupting the electrical supply to the resistor of a component of the abovementioned type, this device comprising means for supplying electrical energy to the coated resistance wire in order to heat the latter to the fusion temperature of its insulating coating layer, detection means for detecting short-circuits on the said resistance wire substantially at the fusion temperature of its insulating coating layer, and stopping means for interrupting the electrical supply to this resistance wire when the said detection means have detected such short-circuits.

Figure 2:
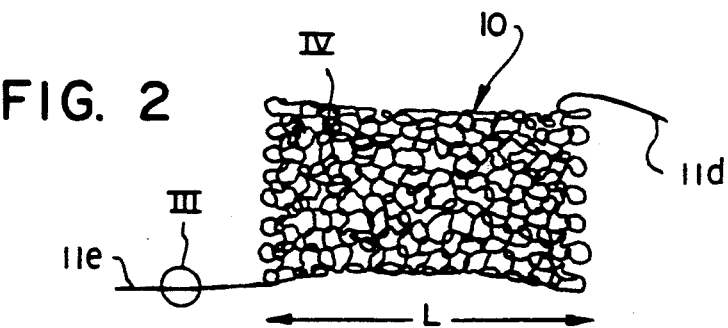
Figure 3:
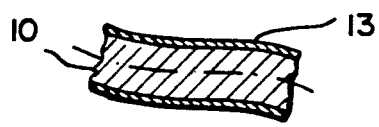
Figure 4:
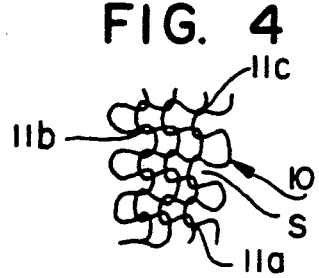
Figure 5:
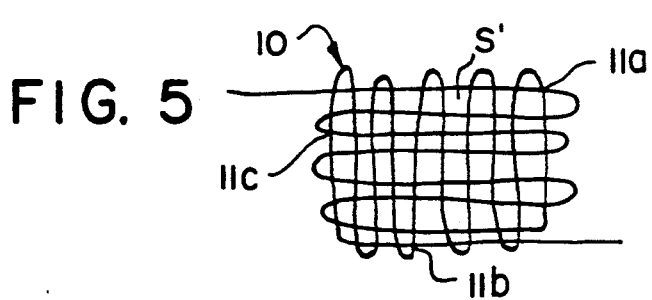
Figure 6:
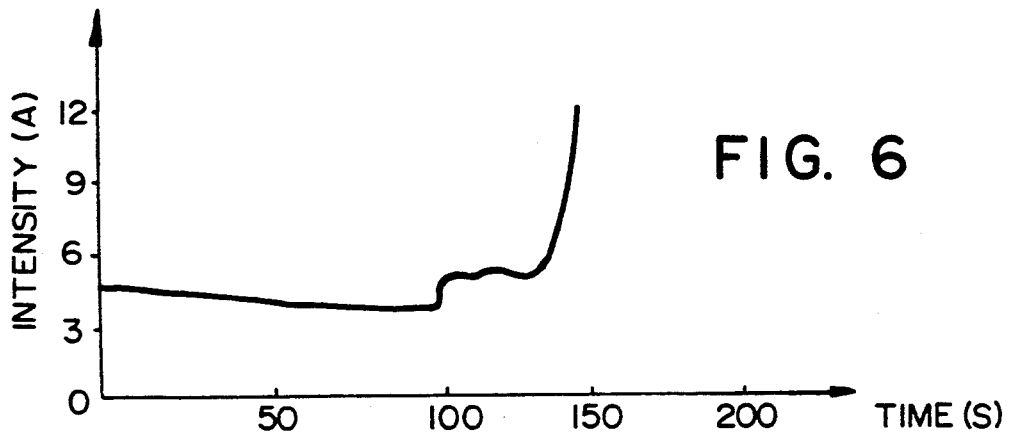
Figure 7:
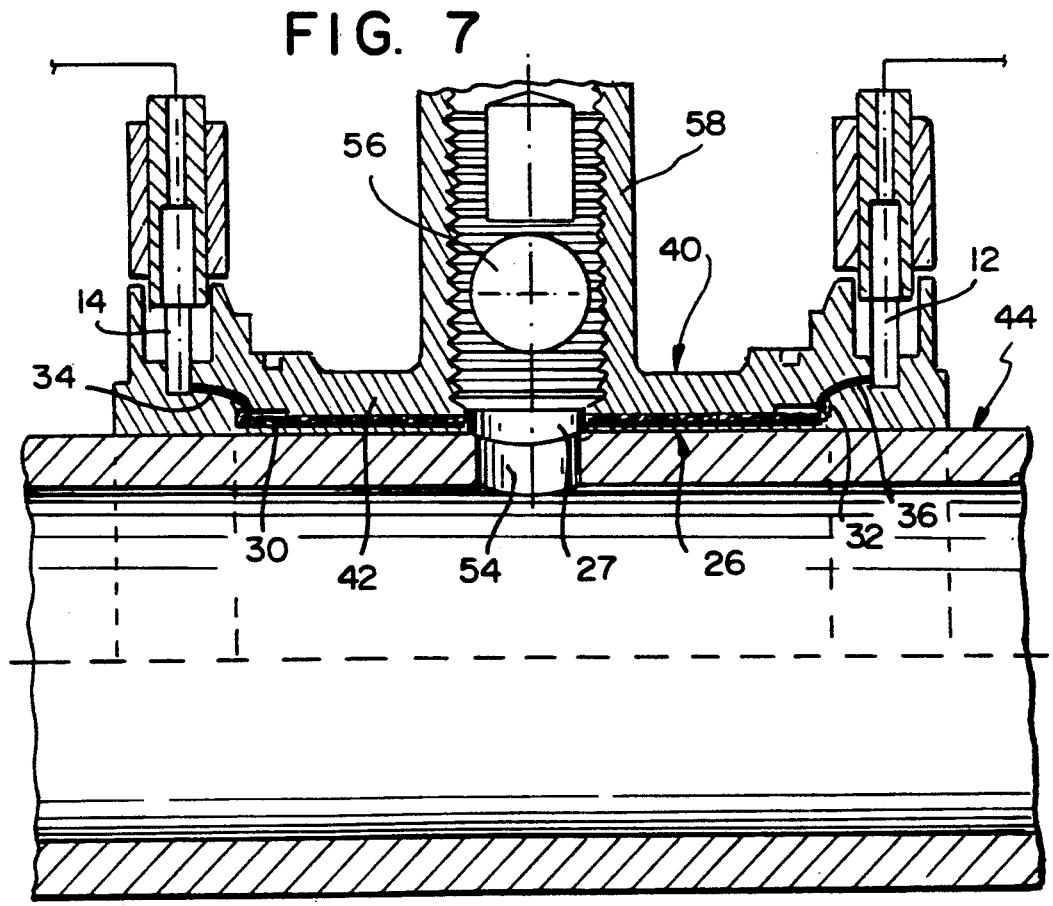

Other explanations, characteristics and advantages of the invention will also emerge from the following description made with reference to the accompanying drawings which are given solely by way of nonlimiting example and in which:

FIG. 1 is a general view in centre cross-section of a connection system employing a sleeve for connecting two pipes end to end, this sleeve being equipped with a meshed conductive net forming a heating resistor according to the invention, FIG. 2 is a view in slight perspective of the conductive net which, in this particular instance, takes the form of a knitted sock or of a kind of "coat of mail" shaped as a cylinder for use in the connection system of FIG. 1, FIG. 3 illustrates the detail identified by III in FIG. 2 in an enlarged view and in longitudinal section, FIG. 4 shows, likewise in an enlarged view, the detail identified by IV in FIG. 2, FIG. 5 is a diagrammatic view of another possible formation of the resistance wire of FIG. 1, FIG. 6 shows the trend of the current circulating in the resistor of the component of FIG. 1 as a function of time, and FIG. 7 is an illustration in centre cross-section of another connection system which, in this particular instance, employs a branch offtake for a transverse connection to a pipe.

Referring first of all to FIG. 1, this therefore illustrates an electrically weldable union designated as a whole by 1 and comprising a connection sleeve 2 equipped with a body made of heat-fusing plastic, into the central orifice 4 of which engage the respective ends 6a and 8a of two cylindrical pipes 6, 8 of substantially circular cross-section which, like the body of the sleeve, are produced from heat-fusing plastic.

The pipes 6 and 8 are arranged coaxially and substantially in the axis 2a of the orifice of the sleeve and have an outside diameter slightly smaller than the diameter $\phi$ of the orifice 4, so that the sleeve and the pipes have mutually opposite corresponding surfaces 4b; 6b, 8b, by means of which it will be possible to join them to one another during the welding.

The plastics which can be used for producing the body of the sleeve and the pipes to be joined together, mention may be made particularly of polyethylene, polyamide, polybutylene and polypropylene.

For joining the pipes together, the sleeve 2 has an electrical heating resistor 10 connected by two removable connecting terminals 12, 14 to an electrical energy source 15, such as a source of rectified alternating current, capable of ensuring a sufficient rise in temperature of the resistor to induce the welding of the components to one another, this taking place with a substantially gas-tight junction and with a mechanical resistance compatible with the use of these components.

According to the invention, the resistor 10 is formed from a single electrically conductive wire having points of intersection, as designated by 11a, 11b and 11c in FIG. 4, where portions of this wire overlap. To prevent short-circuits detrimental to obtaining the best possible heating temperature under good conditions, the wire 10 is covered with an electrically insulating layer 13 (see FIG. 3). According to the invention, this layer 13 has a fusion temperature between a minimum temperature higher than the fusion temperature of the plastic constituting the fusible body of the connection sleeve 2 (and of the pipes to be joined together) and a maximum temperature below the temperature of thermal damage to these same components. Conventionally, "temperature of damage" will refer to the temperature of cracking or breaking of the chains forming the very structure of these components.

Thermal damage to plastic components is manifested by the release of smoke and/or by the formation of cavities in the components after excessive fusion and after an irreversible break of the molecular chains. Splashes of fused material and even leaks at the end of welding are also sometimes seen at the location of damaged welding zones.

Such problems will be avoided by adopting the process of the invention, since the insulating layer will fuse before the temperature of the components reaches this temperature of damage. As soon as this layer is about to fuse, at least at some points of intersection of the resistor there will be short-circuits as a result of direct contact between wire strands then stripped bare.

Outside the component, because this wire is connected to current or voltage measurement means 21, it will be possible immediately to detect these first short-circuits which result in current jumps, as illustrated in FIG. 6 (voltage jumps could also have been shown).

In the example of this FIG. 6, the first short-circuits occur between 100 and 120 seconds after the start of the supply of current to the resistor at a constant voltage of approximately 64 V. At this moment between 100 and 120 seconds, therefore, these variations will be detected and the cut-off of the current accordingly commanded by opening the circuit at 23 (FIG. 1).

It seemed appropriate, in practice, to select the type and thickness of the insulating layer 13 so that it preserves its properties of electrical insulation up to about 300° to 350° C., this corresponding to its fusion temperature, thus allowing some latitude before the components (made of polyethylene in this particular instance) risk being thermally damaged.

As can be seen particularly from FIG. 1, the resistor 10 so formed will be arranged or embedded in the immediate vicinity of the surface 4b of the orifice 4 of the sleeve 2, even directly on this surface, so that the heating zone of the components is located as near as possible to the pipes to be joined together.

In FIG. 1, it will also be seen that the resistor 10 is locally equipped, in the vicinity of its inner face directed towards the pipes, with a protective means, such as a thin strip 16 extending opposite the space e separating the mutually confronting ends of the two pipes.

The function of this strip 16 is to generate a "cold zone" opposite the abovementioned mutually confronting ends of the pipes, in order, during heating, to prevent the possibility that the fused material will flow into the free space e, risking obstructing the pipes at least partially.

So that it performs its function, the strip 16 can therefore extend on the surface over the entire inner periphery of the resistor and will be produced from a material, for example metal, having a fusion temperature higher than that of the surrounding plastic of the pipes, 6 and 8 of the sleeve 2 and indeed even of the resistor 10.

In general terms, this strip 16 will preferably be electrically conductive, and its thickness will be between approximately 0.3 and 0.5 mm.

FIG. 2 illustrates a first entirely suitable embodiment of a resistor 10 which can be used on the component of FIG. 1.

In this particular instance, this resistor has an appearance comparable to that of a portion of a coat of mail with a single woven wire, of general substantially cylindrical shape with a more or less circular cross-section and comprising a succession of "$\Omega$"-shaped (omega-shaped) loops interlaced with one another, both to ensure mechanical cohesion and to provide the overlap or intersection points 11a, 11b etc. of the wire.

As an example, such a net can be formed from a copper wire of a diameter of the order 0.3 to 0.5 mm, covered with a polyesterimide-based insulator with a thickness of the order of a few hundred microns. The wire can be interlaced to form meshes (see especially FIG. 4) of an area S of between approximately 4 and 80 to 100 mm$^2$, with an electrical resistance of between approximately 1 and 10 $\Omega$.

Once produced, the tubular net can have a diameter of the order of 65 mm for a length L (see FIG. 2) of the order of 160 mm.

With a net resistance of approximately 2.7 $\Omega$, it was possible to obtain satisfactory results by supplying the resistor with a constant welding voltage of 32 volts applied for 280 seconds.

Where production is concerned, it will be seen that the use of such a net made from a single wire has the advantage of allowing this net to be connected electrically to the terminals 12 and 14 of the sleeve (or of any other connection component, such as a branch offtake; see FIG. 7), as a result of a simple extension of the two opposite ends 11d, 11e (FIG. 2) of the wire beyond the volume of the net, these ends subsequently being connectable directly to the terminals 12 and 14 in an entirely conventional way, without the need to add supplementary conductors. Such an exemplary embodiment has been shown clearly in FIG. 1.

However, other embodiments of the resistor 10 could be considered.

Moreover, FIG. 5 illustrates an example where the resistor has a series of meanders, the essential factor being that there are points of intersection where the strands of the wire overlap, providing potential zones for short-circuits at the fusion temperature of the coating layer of the resistor.

Furthermore, FIG. 7 illustrates a connection component different from the sleeve illustrated in FIG. 1, but perfectly well known per se, since this component is of the type known by the designation of "branch offtake" used in gas technology for the transverse connection of two pipes.

This branch offtake designated as a whole by 40 takes the form locally of a saddle 42 capable of covering a pipe 44 locally.

Like the sleeve of FIG. 1, the offtake 40 is equipped with removable connecting terminals 12 and 14.

In this particular instance, the heating resistor used is formed in the same way as that of FIG. 1, but with a substantially semi-cylindrical shape.

As with the sleeve, the resistor designated here by 26 is advantageously embedded in the thickness of the branch offtake, in such a way that there is a continuity of material.

Before welding between the offtake 40 and the pipe 44, the resistor had a substantially uniform surface, without a cut.

In contrast, as can be seen from FIG. 7, after the welding and cooling of the components this same resistor then has passing through it an orifice 27 made coaxially with the orifice 54 of the pipe 44, via which the latter communicates with the inner passage 56 of the shank 58 of the branch offtake and, via this inner passage 56, with the other pipe, to which the first pipe 44 is to be connected by the branching of a second pipe (not shown) on the free end of the shank 58.

We claim:

1. A method for electrically welding thermoplastic piping components, wherein facing surfaces of the components to be welded are juxtaposed and heated to fusion by a single-conductor electrical resistance heater carried by one of said components, comprising the steps of:
   a. covering said single-conductor resistance heater with an electrically insulating material, said insulating material having a fusion temperature between a fusion temperature of said thermoplastic piping components and a temperature at which said piping components suffer thermal damage;
   b. disposing said single-conductor resistance heater in a manner providing a plurality of overlapping points where said single-conductor resistance heater intersects itself, said points forming a corresponding number of potential short-circuit points;
   c. providing electrical current to said resistance heater until said insulating material fuses at at least one of said intersection points, causing at least one short circuit in said resistance heater; and
   d. interrupting said electrical current upon an occurrence of said at least one short circuit.

2. In a connector for connecting piping components being formed, at least in part, of a heat-fusible thermoplastic material, said connector being formed, at least in part, of a heat-fusible thermoplastic material and carrying at least one single-conductor electrical resistance heater adapted for heating said thermoplastic material of said connector to effect weldment thereof to said thermoplastic material of said piping components, wherein the improvement comprises:
   said resistance heater including a conductor covered with a coating of an electrically insulating material;
   said insulating material having a fusion temperature higher than a fusion temperature of said thermoplastic material of said piping components and lower than a temperature at which the thermoplastic portion of said piping components suffer thermal damage; and
   said conductor being disposed in a manner providing a plurality of overlapping points where said conductor intersects itself, whereby, when said conductor is heated above said fusion temperature of said insulating material, said conductor establishes electrical contact at at least one of said overlapping points.

3. A connector according to claim 2, wherein said conductor is disposed in the form of a series of interlaced loops.

4. A connector according to claim 2, wherein said insulating material has a fusion temperature in the range of about 300 to about 350 degrees C.

5. A connector according to claim 2, wherein said conductor is formed of copper wire having a diameter between approximately 0.3 mm. and 0.5 mm. and a resistance of between approximately 1 and 10 ohms.

6. A connector according to claim 2, wherein said insulating material is a polyesterimide.

7. A connector according to claim 2, further including:
   means for supplying electrical current to said resistance heater;
   means for detecting a short circuit in said resistance heater; and
   means for interrupting said electrical current upon an occurrence of a short circuit.

8. A connector according to claim 2, wherein said resistance heater forms a network with a cylindrical shape.

* * * * *